US012657104B2

(12) United States Patent
Sharma et al.

(10) Patent No.: US 12,657,104 B2
(45) Date of Patent: **\*Jun. 16, 2026**

(54) IoT EVENT DETECTOR CORRECTNESS VERIFICATION

(71) Applicant: Amazon Technologies, Inc., Seattle, WA (US)

(72) Inventors: Vaibhav Bhushan Sharma, Cupertino, CA (US); Andrew Jude Gacek, Maple Grove, MN (US); Michael William Whalen, Edina, MN (US); Saswat Padhi, Cambridge, MA (US); Andrew Apicelli, Seatte, WA (US); Raveesh Yadav, Redmond, WA (US); Samuel Bayless, Seattle, WA (US); Roman Pruzhanskiy, Kent, WA (US); Rajat Gupta, Seattle, WA (US); Harshil Rajeshkumar Shah, Seattle, WA (US); Fernando Dias Pauer, Lynwood, WA (US); Ankush Das, San Jose, CA (US); Dhivashini Jaganathan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/807,743

(22) Filed: Aug. 16, 2024

(65) Prior Publication Data

US 2024/0403186 A1     Dec. 5, 2024

Related U.S. Application Data

(63) Continuation of application No. 17/543,585, filed on Dec. 6, 2021, now Pat. No. 12,093,160.

(51) Int. Cl.
*G06F 11/34* (2006.01)
*G06F 11/30* (2006.01)
(Continued)

(52) U.S. Cl.
CPC ...... *G06F 11/3447* (2013.01); *G06F 11/3013* (2013.01); *G06F 11/3476* (2013.01); *G06F 11/3604* (2013.01); *H04L 67/62* (2022.05)

(58) Field of Classification Search
CPC ........ G06F 30/23; G06F 30/30; G06F 30/398; G06F 11/36; G06F 11/3604; G06F 11/3608; G06F 11/3684
See application file for complete search history.

(56) References Cited

U.S. PATENT DOCUMENTS

| 5,854,924 A | 12/1998 | Rickel et al. | |
| 12,093,160 B1 * | 9/2024 | Sharma | ............... H04L 67/12 |

(Continued)

OTHER PUBLICATIONS

Vaibhav Sharma, et al., "How to troubleshoot an AWS IoT Events detector model", Retrieved from https://aws.amazon.com/blogs/iot/troubleshoot-aws-iot-events-detector-model/ on Nov. 21, 2021, pp. 1-5.

(Continued)

*Primary Examiner* — Michael Maskulinski
(74) *Attorney, Agent, or Firm* — Robert C. Kowert; Kowert, Hood, Munyon, Rankin & Goetzel, P.C.

(57) ABSTRACT

System and methods for IoT event detector correctness verification. Detector models (e.g., state-based models including variables, states, transitions and actions) take IoT device data as input and detect, based on the data, events that triggers actions. To verify a correctness of the models prior to deploying the models at scale, an event detector model correctness checker obtains a representation of a definition of the model, verifies, based on analysis of the model definition, whether the model complies with correctness (Continued)

properties, and generates a report indicating whether the model complies. Example correctness properties include a reachability correctness property that indicates that respective states or actions are reachable according to the definition of the event detector model. The analysis may be accessed via an interface element and may result in generation of a report that identifies a location of non-compliance within the model definition.

20 Claims, 10 Drawing Sheets

(51) Int. Cl.
G06F 11/3604 (2025.01)
H04L 67/62 (2022.01)

(56) References Cited

U.S. PATENT DOCUMENTS

| | | |
|---|---|---|
| 2008/0250427 A1 | 10/2008 | Shin |
| 2010/0088678 A1 | 4/2010 | AlTurki et al. |
| 2022/0365868 A1 | 11/2022 | Rao et al. |

OTHER PUBLICATIONS

Amazon, New troubleshooting feature now generally available for AWS IoT Events, Feb. 23, 2021, Retrieved from https://aws.amazon.com/about-aws/whats-new/2021/02/new-troubleshooting-feature-generally-available-aws-iot-events/ on Nov. 11, 2021, pp. 1-4.

Trimananda et al., "Understanding and Automatically Detecting Conflicting Interactions between Smart Home IoT Applications", 2020, Association for Computing Machinery, pp. 1215-1227, (Year: 2020).

Keating et al., "An Industrial Application of Model Checking to a Vessel Control System," 2011 Sixth IEEE International Symposium on Electronic Design, Test and Application, Queenstown, New Zealand, 2011, pp. 83-88 (Year: 2011).

Person et al., "Directed Incremental Symbolic Execution", Jun. 2011, Association for Computing Machinery, pp. 504-515, (Year: 2011).

AWS IoT Events Developer Guide, Feb. 23, 2021, pp. 1-206 (Year: 2021).

Wikipedia, "Linear time property", citations within Wikipedia entry are from 2008-2017, pp. 1-5 (Year: 2017).

Hammad et al., "Compositional verification of sensor software using uppall." 2012 IEEE 23rd International Symposium on Software Reliability Engineering, IEEE, pp. 351-360. (Year: 2012).

* cited by examiner

IoT EVENT DETECTOR CORRECTNESS VERIFICATION

PRIORITY APPLICATION

This application is a continuation of U.S. patent application Ser. No. 17/543,585, filed Dec. 6, 2021, which is hereby incorporated by reference herein in its entirety.

BACKGROUND

The Internet of Things (IoT) is a phrase given for the interconnection of computing devices scattered around the globe within the existing Internet infrastructure. IoT devices may be embedded in a variety of products, such as home appliances, manufacturing devices, printers, automobiles, thermostats, smart traffic lights, etc.

Controlling entities want to monitor their IoT devices for events and trigger notifications when an event occurs. Some entities monitor their IoT devices by creating detectors (e.g., logic that takes data from IoT devices as input and monitors the incoming data for events). When an event occurs, some detectors trigger external actions such as sending a message to a message service topic being monitored by a human operator. A mistake made by the detector (e.g., an error in the underlying logic or implementation of the underlying logic) can lead to missed event notifications (or ignored notifications in the case of too many false positive alerts) and thereby cause a human operator (or an application that depends upon the notifications) to miss taking steps to respond to the event.

The large scale of IoT device deployment magnifies even minor errors (e.g., a single error repeated across a large number of detectors can be difficult to manage) leading customers to distrust or ignore services that produce error-prone monitoring signals.

Figure 1:
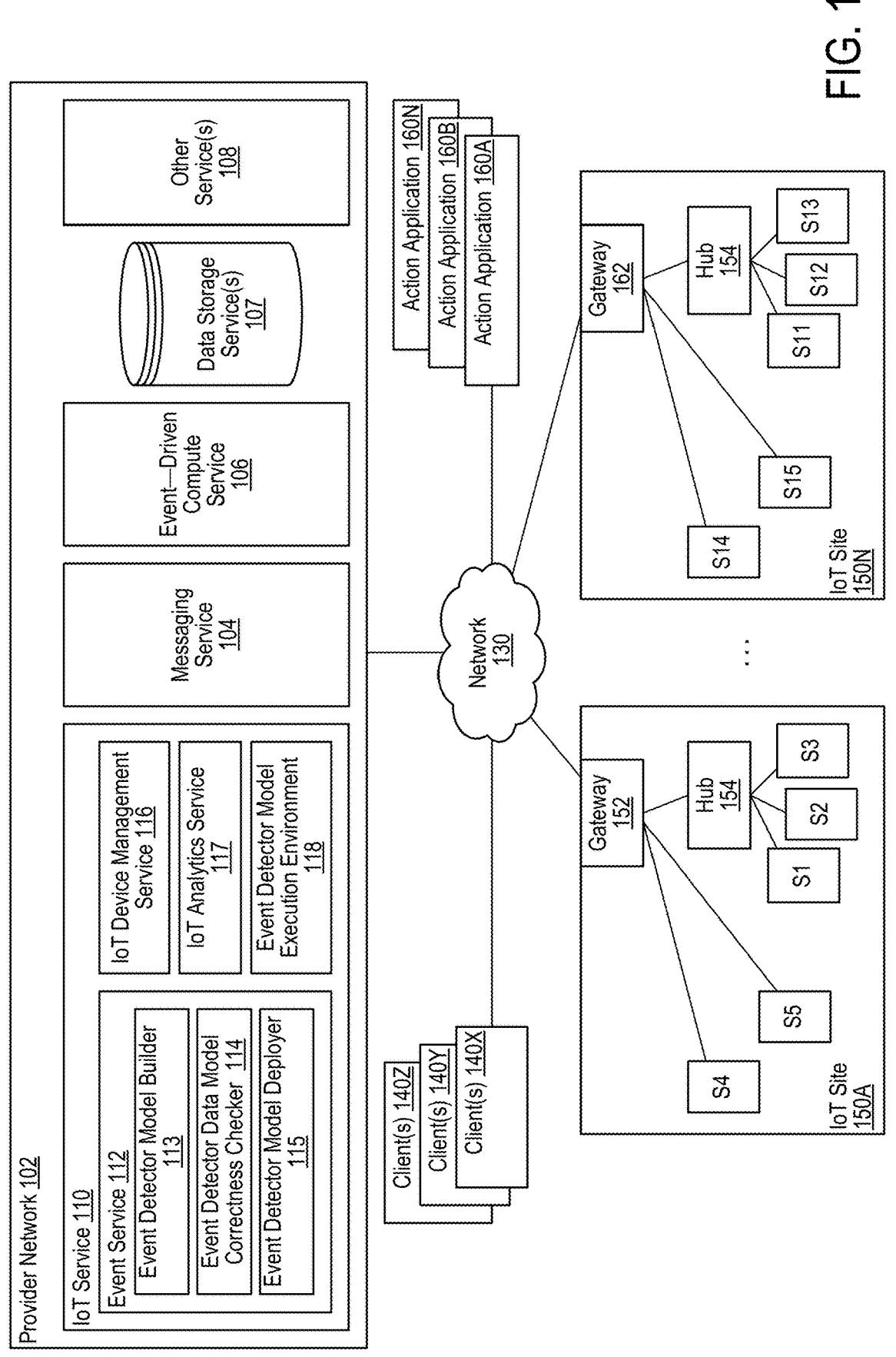
FIG. 1 illustrates a system architecture of a provider network that implements IoT event detector correctness verifications, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for IoT event detector correctness verifications are disclosed. In embodiments, correctness checks may be performed without executing the model against test data (e.g., correctness checks may instead analyze a representation of the model definition). In embodiments, instead of executing the data model against test data, a representation of the definition of the detector model serves as input for the correctness checks. For example, one or more analysis tools may reason over a representation of the detector model definition to determine correctness of the model. Such a strategy may provide a more complete analysis (as opposed to testing the model with test data that fails to investigate all possible inputs) in embodiments.

Embodiments described herein may function according to various domain-specific properties for IoT that are explored as part of a correctness verification. Additionally, the functionality described herein may provide a more automated approach (e.g., performing a more accurate and complete correctness check of a detector model). The system may automate analysis by performing the correctness check in response to selection of a single interface feature (e.g., a selectable interface component or similar) in embodiments. In some embodiments, the correctness checks performed on the detector model may be domain-specific correctness checks (e.g., correctness checks particular to IoT data and/or device domain, correctness checks particular to operations in a medical domain, correctness checks particular to operations in an industrial domain, correctness checks particular to a particular type of data domain, etc., without limitation.

Embodiments describe techniques for performing a correctness check on detector models without executing the model against test data. For example, in embodiments described herein, a test engineer does not have to provide any test cases or write any test code in order to perform the correctness check. Instead, techniques herein analyze the model definition itself (without actually running the model like in traditional testing). In some embodiments, some of the tools described herein may simulate model execution for various inputs.

In an example, the correctness checker identifies parts of the model definition that violate a correctness property. For example, a particular state may not be reachable, a particular action may be impossible to trigger, a given transition may never occur, a given timer may cause an endless loop, or a given variable may be accessed (e.g., for a transition) before it is set. Instead of running the model and applying different inputs to see what inputs causes incorrect behavior (a process that does not test all possible paths and inputs because there are too many possibilities to test) the correctness checker reasons over a representation of a definition of the model, performing a more complete verification of the model by examining all possible paths and inputs, in embodiments.

Detectors

After defining a detector model, customers send data from IoT devices to the model. On receiving the first input for a detector model, the IoT service spawns a detector and routes the input to it. The detectors (e.g., state-machine based detectors) of monitor the data from the IoT devices for events and trigger notifications when events occur.

In embodiments, a detector model models equipment or a process, using logic to detect events that change a state of the detector model and that trigger actions, for example. A detector model may include a set of states. Each detector's state may be specified via variables and timers. A timer can be set, reset, and cleared, for example. An IoT event service may keep track of the timestamp at which a timer expires. Upon timer expiration, the IoT event service may generate a timer input for the detector. A detector waits infinitely for inputs, in embodiments.

During testing of a detector model, an action that is never executed is hard to debug. For example, an action may never be executed because the test did not send an input that caused execution of the action in the detector model, or the logic of the detector model is such that the action can never be executed regardless of the test input value sent to the detector model. In embodiments described herein, an action that can never be executed, regardless of the input values sent to the detector model, is an unreachable action. Customers of the IoT service may want to verify (e.g., via testing) that every state and/or action in their detector model is reachable (e.g., to avoid errors during operation of the detector). They may also want to verify that every condition used in transitions or events in the detector model is satisfiable.

In embodiments of IoT event detector correctness verifications, mistakes (mistakes of logic or otherwise) can be discovered and customers made aware of such mistakes as the detectors are created (customers may create customized detectors or configure domain-specific or default detectors, in embodiments). In some embodiments of IoT event detector correctness verifications, the correctness checks can be performed without executing a detector model used in development of the detector. For example, in some embodiments of IoT event detector correctness verifications, the logic of a definition of the model may be checked without executing the detector model.

Some IoT services facilitate creation of customizable event detectors that use data from IoT devices as input data and monitor the incoming data for events. When an event occurs, the detector may be configured with customizable logic that triggers external actions, (e.g., such as but not limited to sending a message to a message service topic being monitored by a human operator). A mistake in the logic of the detector can lead to missed event notifications, and/or false positives.

In a particular example, a detector may be customized with logic for monitoring data about an industrial boiler temperature for the event of the boiler overheating. If the detector detects (from monitoring the data) an overheating event, the detector may function to notify a messaging service topic (e.g., a topic monitored by a human operator, or by an application that takes corrective action to bring down the boiler temperature). For a detector configured with faulty logic that causes the overheating event to not be detected, the message service topic is not notified when the data indicates that the boiler is overheating. Corrective action to bring down the boiler's temperature is not performed in the latter case.

Techniques disclosed herein may automatically check IoT event detectors for correctness with respect to certain correctness properties. Some techniques apply symbolic execution to detector models, abstractly evaluating all possible inputs and executions of the detector model. Techniques disclosed herein may test that each execution satisfies certain correctness properties, and identify violations of those correctness properties.

In embodiments, a variable or an input may be referred to as "symbolic" when it simultaneously refers to a large set of values the variable or input can assume. A variable or input may be referred to as "concrete" when it refers to a single value. For example, a currState variable may start off referring to State.Normal and later refers to State.Offline. Since it always only refers to a single State, it may be referred to as a concrete variable.

In embodiments, symbolic execution is a technique that performs non-standard execution of a detector model. For example, symbolic execution may symbolically execute a detector by replacing its inputs with symbolic variables. Symbolic execution may function to explore feasible behaviors through the detector by using a solver underneath. The underlying solver reasons about satisfiability of boolean conditions, for example. Symbolic execution can be performed for source-level languages such as Java, intermediate representations such as LLVM, as well as binary code. In some embodiments, the detector model definition may be translated into such languages for symbolic-execution based analysis.

Various types of model checking may be implemented. In embodiments, the reachability check is performed by applying a model checking technique. For example, a model checker is a tool that takes a detector model definition as input and reasons about all possible execution paths through the definition on all possible inputs looking for instances on which the property does not hold. Two variants of the model checking technique described herein may be relevant to reachability analysis.

Bounded Model Checking

Bounded model checking tools implement a technique to verify a property within a set of bounds. An example of such a bound is the number of inputs that can be given to a detector model. Bounded model checking may be applied as part of the disclosed techniques to verify reachability within a bounded number of inputs to the detector model.

In embodiments, the model correctness analysis may use bounded model checking. Bounded model checking is a technique that performs reasoning similar to symbolic execution, for example. A difference from symbolic execution is that, instead of reasoning one execution path at a time like symbolic execution, model checking may unroll the entire control-flow graph and reasons about the entire program at once. The number of times a control-flow graph is unrolled is usually bounded by some positive integer, k. One way to think about the bound, k, is in terms of number of inputs. In some embodiments describe herein, the IoT event service 112 can use bounded model checking to examine the detector model for violations of a property within the first k inputs given to the detector model.

Bounded model checking may facilitate specification of temporal properties. For example, it may be easier to specify a property that says "The Offline state must eventually be reached" to a model checker instead of a symbolic executor. In some embodiments, the IoT service may also run a bounded model checker (e.g., on the Java program) to verify the property "The Offline state must eventually be reached," for example. In some embodiments, a correctness check may be performed with both a model checker and a symbolic checker (in parallel or in series).

In embodiments, IoT event service 112 imposes bounds over detector models that customers create. For example, a bound may be defined such that no detector model can have more than five timers. Some such bounds can be useful for IoT event service to deliver performance with reasonable latency. In embodiments, IoT event service 112 may function to impose similar bounds for automated reasoning over a representation of the detector model definition based on the reasoning technique used and time budget allocated to it. Imposition of some such bounds may serve to limit the number of execution paths through the detector model definition that the automated reasoning tool has to analyze, in embodiments. An example of such a bound is the number of inputs used to analyze the detector model. The transition from Normal to Offline may be configured to happen only after 10 negative values have been received for input. Therefore, in such an example, every analysis must be run for at least 10 inputs. In embodiments, the reachability analysis can be bound to a small number of inputs, a small time duration, or both.

The second example, inductive model checking, first verifies a property within a bound k. This bound k is inferred by the inductive model checker itself. Next, inductive model checking attempts to inductively prove that the property holds for any arbitrary extension of the bound. If the property is found to hold for any such arbitrary extension, then the property is guaranteed to hold for an unbounded number of inputs, for example.

In embodiments, a symbolic variable appearing in a conditional expression can cause both sides of the condition to be satisfiable. An execution through all such conditions with symbolic variable(s) as operands may be described as an execution path. Consider, for example, the condition: input<0. One execution of this condition with a value of −1 provided for input will cause this condition to evaluate to −1<0 which evaluates to true. A different execution of this condition with a value of 0 provided for input can cause this condition to 0<0 which evaluates to false. Making input symbolic allows it to represent both kinds of values, those greater than or equal to 0 and also those less than 0. An execution through all such symbolic conditions that reaches the end of the detector model definition may be described as an execution path.

Correctness Properties

The system may include logic for performing any of various types of analysis with respect to checking correctness of the detector models. For example, the system may be configured with logic that checks the detector models for various correctness properties. The system may be configured with a set of default correctness properties and/or may function to receive input that defines customized correctness properties, in various embodiments. Correctness properties may pertain to states, actions, transitions, variables, timers or other features of the detector model, for example.

An example of a correctness property is a satisfiability property, whether every condition, used in transitions or events, in the detector model is satisfiable. Another example of a correctness property is a reachability property (e.g., a reachability property may determine whether features of the model (e.g., a state, an action, etc.) can be reached. For example, a state is "reachable" if there exists a sequence of input values that causes the detector model to set that state as its current state. A transition may be defined as "reachable" if there exists a sequence of input values that causes the condition in the transition to be satisfied. A reachable action is "reachable" if there exists a sequence of input values that causes the action's condition to be satisfied, in embodiments.

The term reachability may collectively refer to checking for reachability of a state as well as reachability of a transition or action. Also, the term unreachable may to refer to a state, transition, or action found to not be reachable. In embodiments, it is preferable for the reachability analysis to have zero false positives and low false negatives.

Given a detector model, embodiments described herein may prove reachability by starting with a symbolic value for every variable in the system state of the detector model. This captures the set of all possible values for variables the detector model, for example. Embodiments then execute paths through the detector model with inputs substituted with symbolic variables. States not reached as a result of this path exploration maybe deemed unreachable. Similar reasoning may be applied to determine unsatisfiable transition and event conditions, in embodiments.

In embodiments, an example reachability correctness property functions as a check on all actions that the event detector can trigger on detecting an event. Consider, for example, that the overheating event is detected when a boiler's temperature exceeds 120 degrees for more than 5 minutes. An event detector may include a logical expression that causes the event detector to monitor the last 5 minutes by maintaining a timer named awake in its state. When the logical expression evaluates to true, the detector transitions to a different state and triggers a messaging service action to generate a notification.

In some systems, once a timer has been set, the timer times out exactly once. In the case that the messaging service action is predicated on the condition timeout ("awake") a second call to timeout returns false. This would cause the messaging service action to never be executed, and effectively be unreachable (an undesirable functionality, or at least an indication of improper logic). Embodiments use various techniques, such as but not limited to symbolic execution to check every part of event detector for these and similar types of reachability issues.

Another example correctness property that pertains to reachability is a "variable set value" correctness property. The property is correct when variables in the detector model are set to values before being used, in embodiments. For example, such a correctness check may verify that every variable in the detector model is set to a value before being used.

Another example correctness property that pertains to reachability is a "variable value exists" correctness property. The property is correct when a value exists for the variable, in embodiments. For example, such a correctness check may verify that a read from a variable cannot be executed if no value exists inside the variable.

Another example correctness property that pertains to reachability is a "timer set" correctness property. The property is correct if every timer in the detector model is set before being reset or cleared, in embodiments. For example, such a "timer set" correctness check may verify that every timer must be set before being reset or cleared.

In embodiments, the IoT service may function to find instances of stale-value-reads (another correctness property pertaining to reachability). For example, customers of the IoT event service want to know if an expression reads from an input even though the expression evaluation was not triggered by a timer expiration and not a new input message. The property is correct when a detector model cannot read from an input when triggered by a timer expiration—the read must be from a new input message.

Yet another example correctness property that pertains to reachability is an "infinite read" correctness property. The detector model should not have infinite loops. The property is correct when a detector model cannot infinitely send inputs to itself due to a timer expiration. For example, no detector model should be able to infinitely send inputs to itself due to timer expiration. Given that the detector exists in some state S, if the detector reaches state S again due to only timer expiration inputs, then it has an infinite loop and the detector model is logically incorrect and non-compliant with this correctness property.

Other correctness properties are contemplated without limitation, and the techniques described herein are not restricted to the preceding set of properties. It is contemplated that the system may be configured with an interface (a GUI, CLI, or API-based interface, etc.) to receive specification of custom correctness properties and to perform custom correctness checks based on such properties specified by customers or administrators or the like.

In embodiments, when one or more correctness properties are violated in the detector model, the disclosed technique may include reporting back the property that was violated along with the location in the detector model where the property violation occurred.

In addition to verification of state, transition, and action reachability it is also contemplated to check the additional example properties of: (a) check for deadlocks and livelocks by creating analogous properties in detector models, (b) check for transitions or actions whose conditions are always true (c) figure out a range of values for state variables and inputs, and (d) create a set of concrete test inputs that can be used to reach a state or fire a transition or action, and the like.

Figure 7:
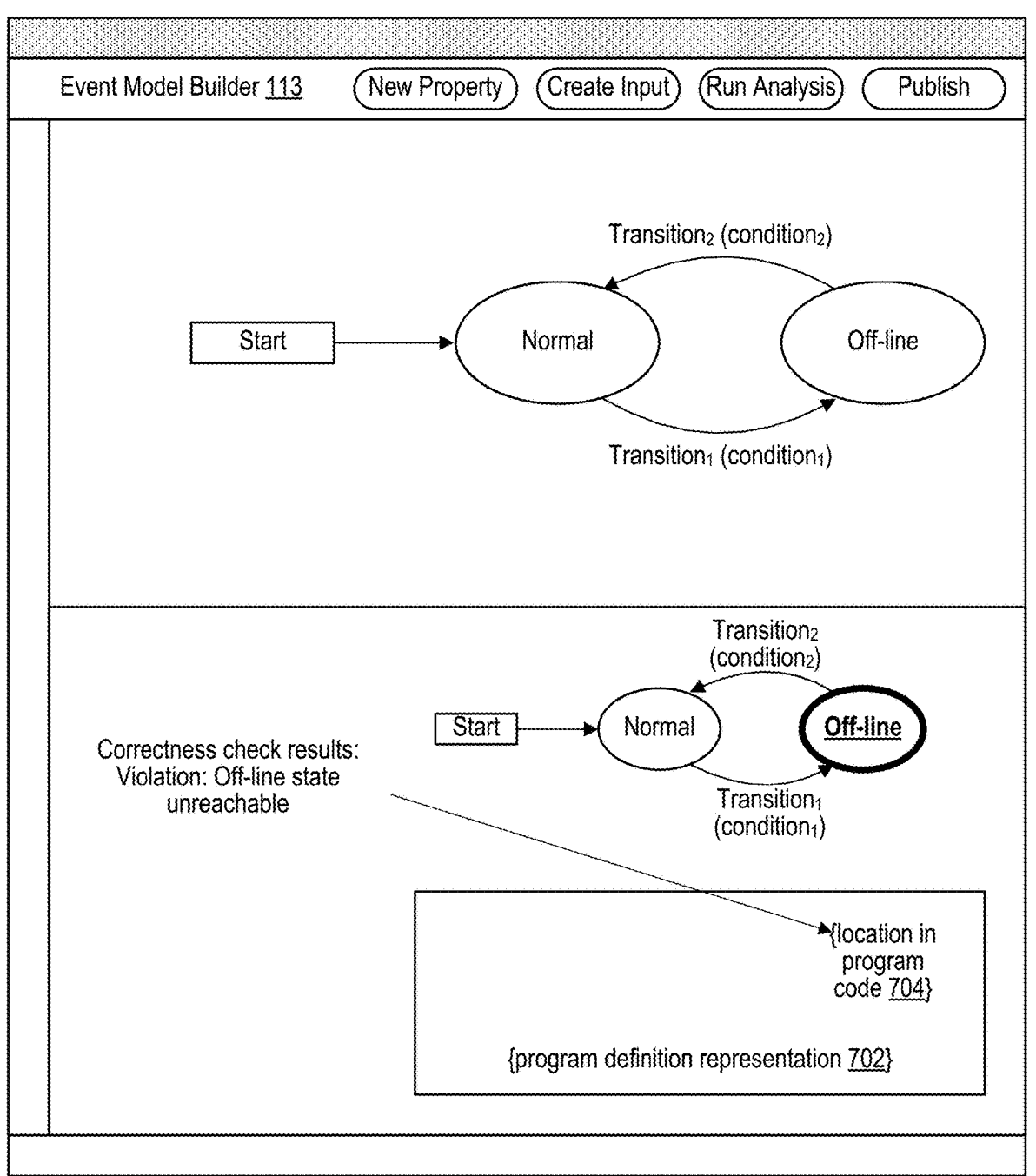
FIG. 7 illustrates a user interface for a system that implements IoT event detector correctness verifications, according to some embodiments.

Attention will now be brought to the figures. Generally, components illustrated in block diagrams 1-3 and 8-9 may perform at least some of the functionality illustrated in process diagrams 5A, 5B and 6, that is associated with detection models having various states, an example of which is illustrated in FIG. 4. FIG. 7 illustrates an interface for a software application that includes at least some of the components illustrated in FIGS. 1-3 and 8-9 and that implements at least some of the functionality illustrated in process diagrams 5A, 5B and 6.

FIG. 1 illustrates a system architecture of a provider network that implements IoT event detector correctness verifications, according to some embodiments. Various of the illustrated components of provider network 102 may be implemented by components illustrated in FIGS. 8-9, and may perform various portions of the functionality illustrated in process diagrams 5A, 5B and 6, in embodiments.

Overall, sensors S1-S15 at various IoT sites 150A-N (connected via site networks) produce data and pass the data (e.g., via gateways 152, 162) over network 130 to a provider network 102. Detectors executing in event detector model execution environment 118 receive the data as input (e.g., either directly or via an IoT analytics service 117 that pre-processes the data, or otherwise).

In the illustrated embodiment, an event detector model builder 113 of event service 112 provides functionality for building detector models. For example, the model builder may include various interface features for customers (e.g., via clients 140A-X) to build detector models. Event detector data model correctness checker 114 performs correctness checks (e.g., illustrated in FIGS. 5A, 5B, 6 described below) on the detector models built via the model builder 113 or on imported detector models, in embodiments.

In embodiments, the event detector data model correctness checker 114 may perform a correctness check using more than one type of analysis tool. For example, various types of analysis tools vary in the amount of time needed to perform the respective analysis of the model. Correctness checker 114 may initiate more than one analysis tool for the correctness check, and then report the results from the first analysis tool to finish while waiting for another analysis tool to complete the correctness check. In one example, a bounded analysis too and an unbounded analysis tool may both be selected for parallel processing a correctness check of a model definition. The bounded analysis tool may complete early, providing an initial assessment result of the model, and the unbounded tool may continue to perform a more complete analysis while the results from the bounded analysis tool are presented.

Event detector model deployer 115 deploys the models to event detector model execution environment 118. IoT device management service provides functionality to securely register, organize, monitor, and remotely manage IoT devices at scale, in the illustrated embodiment. IoT analytics service 117 is a managed service that facilitates running and operationalizing analytics on massive volumes of IoT data, in the illustrated embodiment.

For a given detector model, any of various actions may be triggered based on an event. For example, an event may trigger the detector to send a message (via messaging service 104) or make a call, to an application (e.g., to an event-driven compute service 106, to other services 108, or a to web-server or external action application 106A-N) or to an operator, notifying the application or operator of some event. In some embodiments, the action may be to store a value to or to obtain a value from a data store of data storage service 107 (e.g., indicating an event happened).

Correctness properties used during a correctness check (e.g., illustrated in FIGS. 5A, 5B and 6, described below) may be specified by client(s) 140X-Z, in embodiments. In some embodiments, correctness properties checked during a correctness check of a detector model may be determined based on data analysis (e.g., analysis of data from the sensors S1 . . . S15) performed by the IoT analytics service 117.

Figure 2:
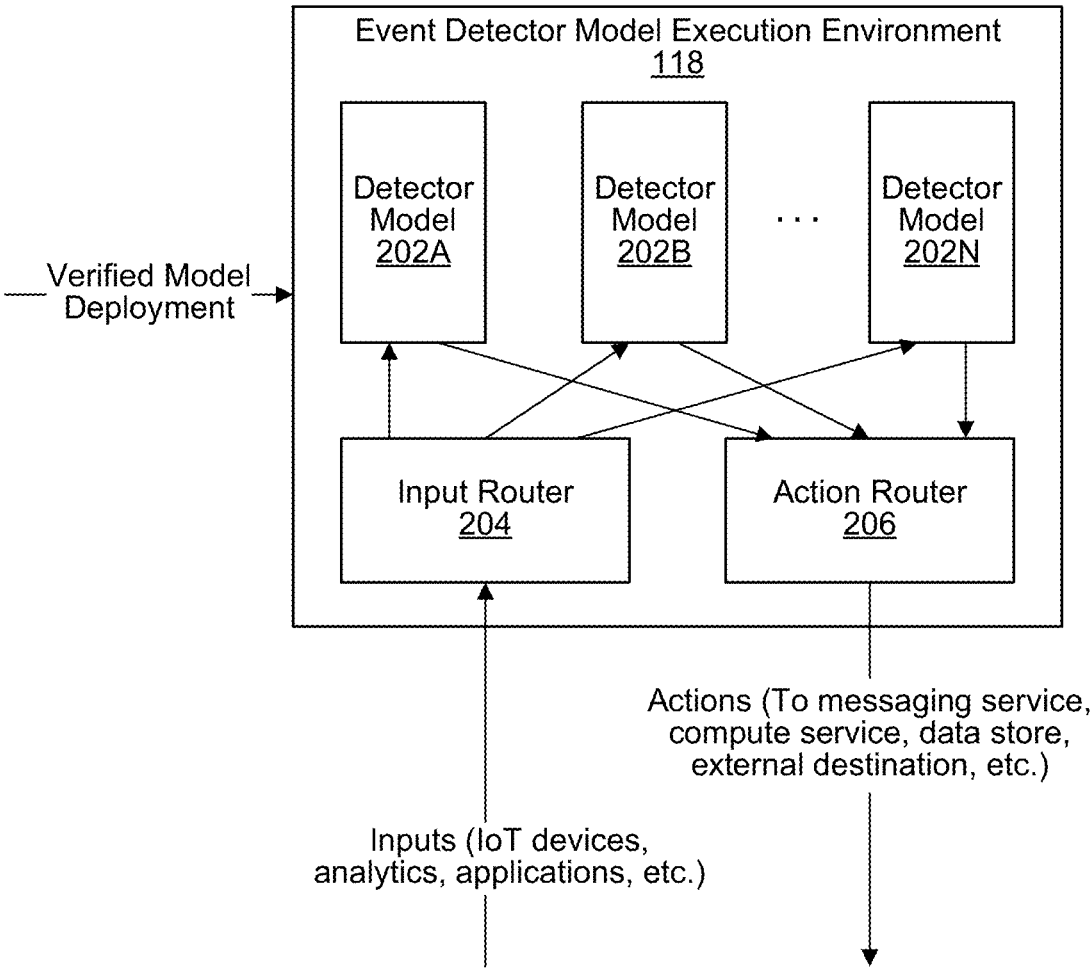
FIG. 2 illustrates a combination block diagram and data flow diagram for an execution environment that executes detector models that have undergone correctness checks, according to some embodiments.

FIG. 2 illustrates a combination block diagram and data flow diagram for an event detector model execution environment 118 that executes detector models that have undergone correctness checks, according to some embodiments. In the illustrated embodiment, event detector model execution environment 118 is an execution environment for executing detector models 202A-N. In the illustration, detector models 202A-N are verified models (models that have already undergone a correctness check as describe herein) and that have then been deployed (e.g., via event detector model deployer 115) to the event detector model execution environment 118. The detector models 202A-N were found in compliance with a correctness check prior to being executed in execution environment 118, in the illustrated embodiment.

In particular, FIG. 2 illustrates that data from IoT device, analytics service 117, or other application are received at an input router 204 (the illustrated router(s) facilitate movement of data in large-scale systems) that distributes the data as inputs to the detector models 202A-N. The detector models 202A-N process the inputs and produce output action that are sent to action router 206 that distributes the actions further, in the illustrated embodiment. In some embodiments, the detector models may send outputs elsewhere, such as directly to messaging service 104, event-driven compute service 106, data storage service 107, other services 108, action applications 160A-N, clients 140X-Z or even back to IoT sides 150A-150N.

Figure 3:
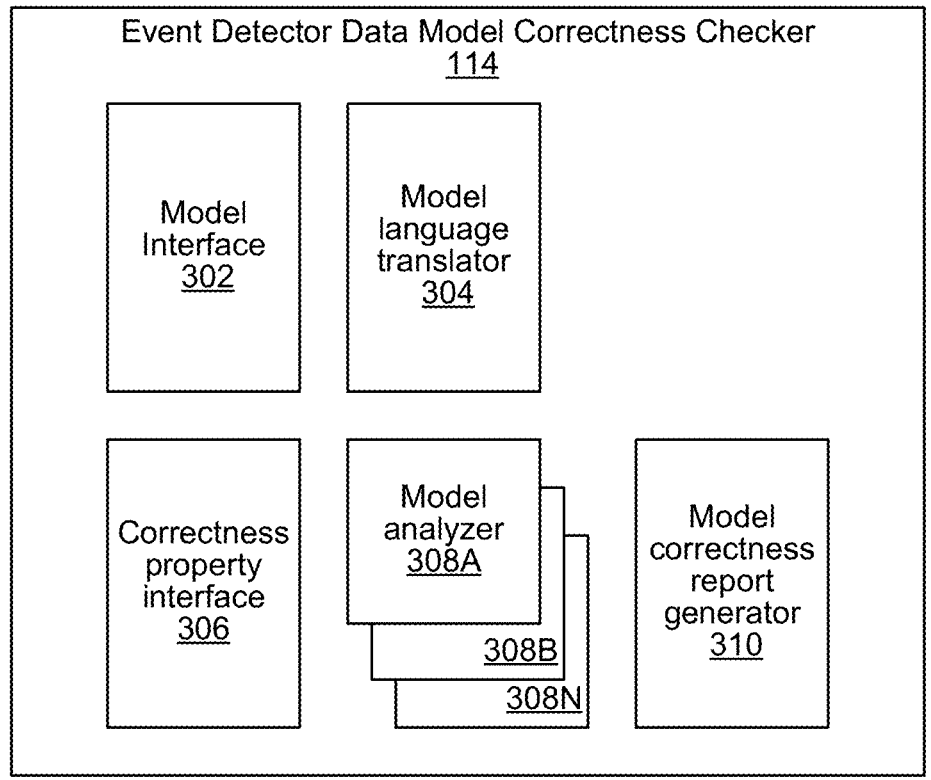
FIG. 3 is a block diagram that illustrates an event data model correctness checker that implements IoT event detector correctness verifications, according to some embodiments.
Figure 4:
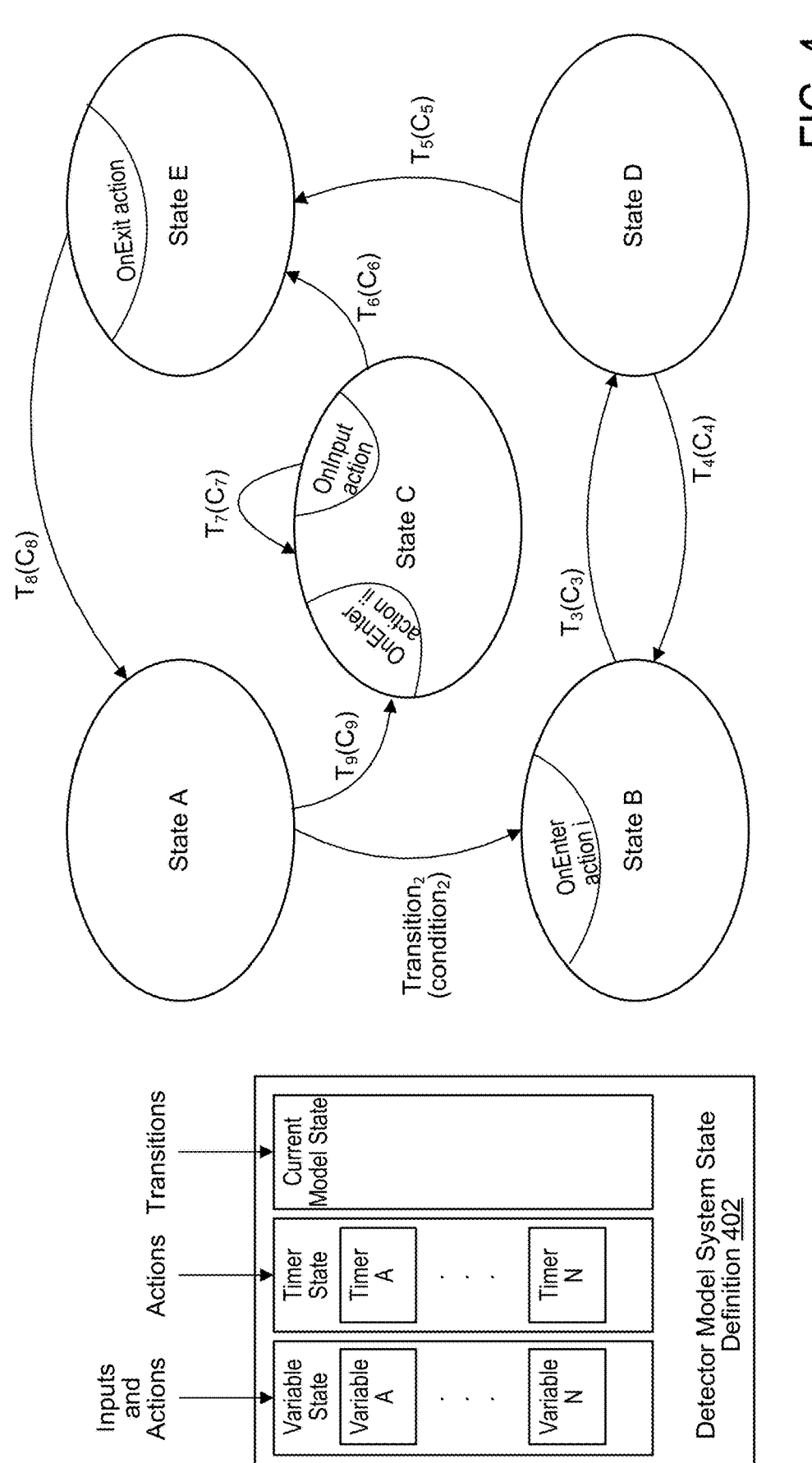
FIG. 4 illustrates a model definition that includes state diagram for a detector model subject to IoT event detector correctness verifications, according to some embodiments.

FIG. 3 is a block diagram that illustrates an event data model correctness checker 114 that implements IoT event detector correctness verifications, according to some embodiments. FIG. 3 illustrates various components that may perform functionality illustrated in FIGS. 5A, 5B and 6, for example.

FIG. 3 illustrates model interface 302, which may function to receive identification of the detector model on which the correctness check will be performed. For example, model interface 302 may include a user interface for uploading a detector model to the IoT service, or may include interface elements for specifying a location from which the IoT service can retrieve the detector model (e.g., in data storage service 107 or the like). In some embodiments, model interface 302 may function to provide interface elements for building detector models.

In embodiments, model interface may function to provide an interface for receiving (e.g., from test engineers) selection of types of one or more analysis tools to be applied during a correctness check. The interface may also function provide an interface for receiving selection of one or more models for the correctness to be performed on. For example, model interface may function to provide an interface for specifying that multiple different types of analysis tools are to be applied across multiple different models, in some embodiments (e.g., in parallel or in series).

Event detector data model correctness checker 114 is illustrated with model language translator 304. In some cases, the detector model or the detector model definition may require translation into another representation (e.g., into a particular representation of language). For example, translation may include converting (e.g., compiling) the detector model definition into a different representation (e.g., into a language that a particular analysis tool is capable of processing).

Event detector data model correctness checker 114 is illustrated with correctness property interface 306. Correctness property interface 306 may function to receive specification of custom properties (e.g., for a custom detector model) from a test engineer. The custom properties may be applied in a manner similar to how the correctness properties are applied herein, during the correctness check, for example.

Figure 5A:
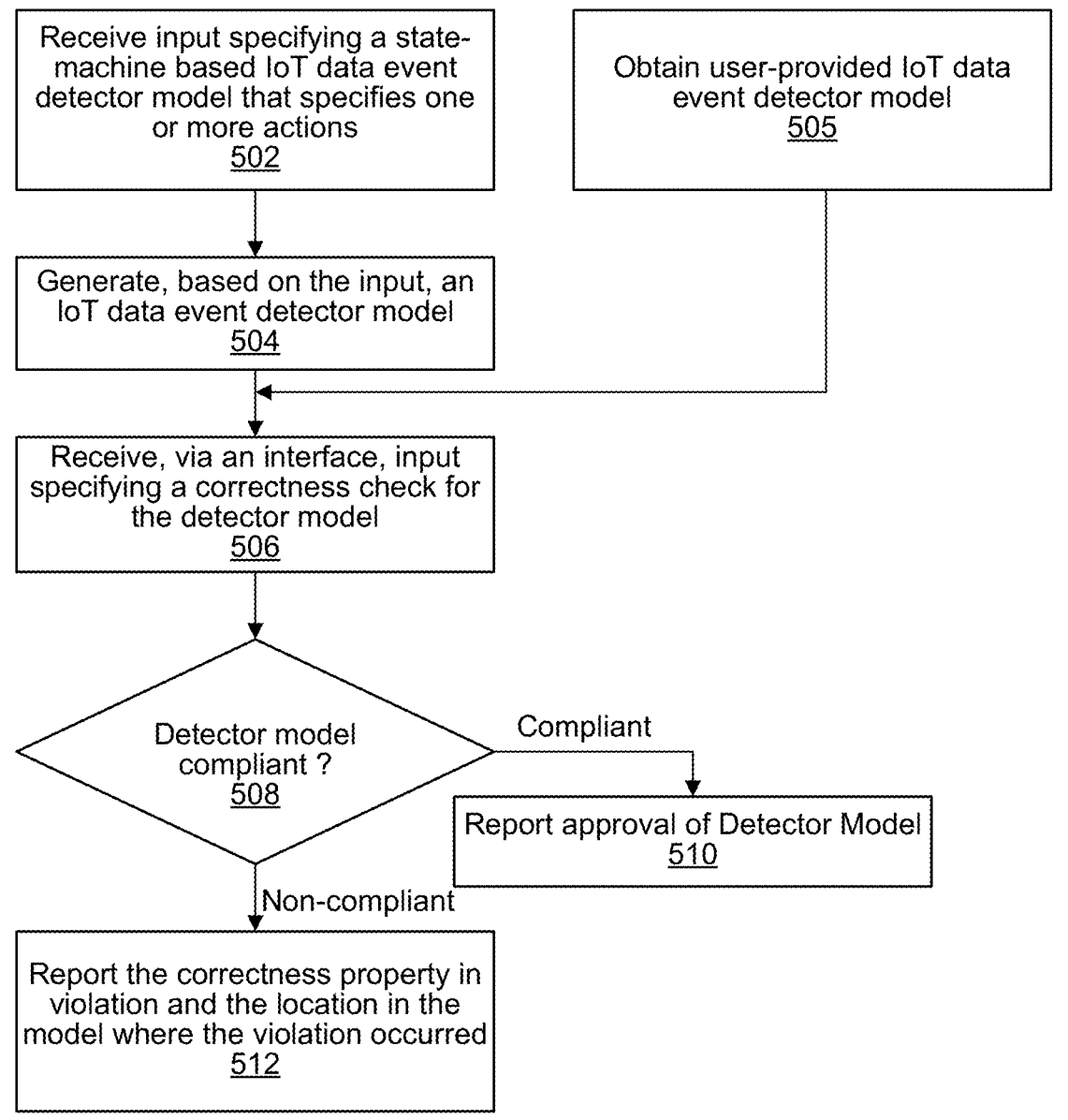
FIG. 5A illustrates a flowchart for IoT event detector correctness verifications, according to some embodiments.
Figure 5B:
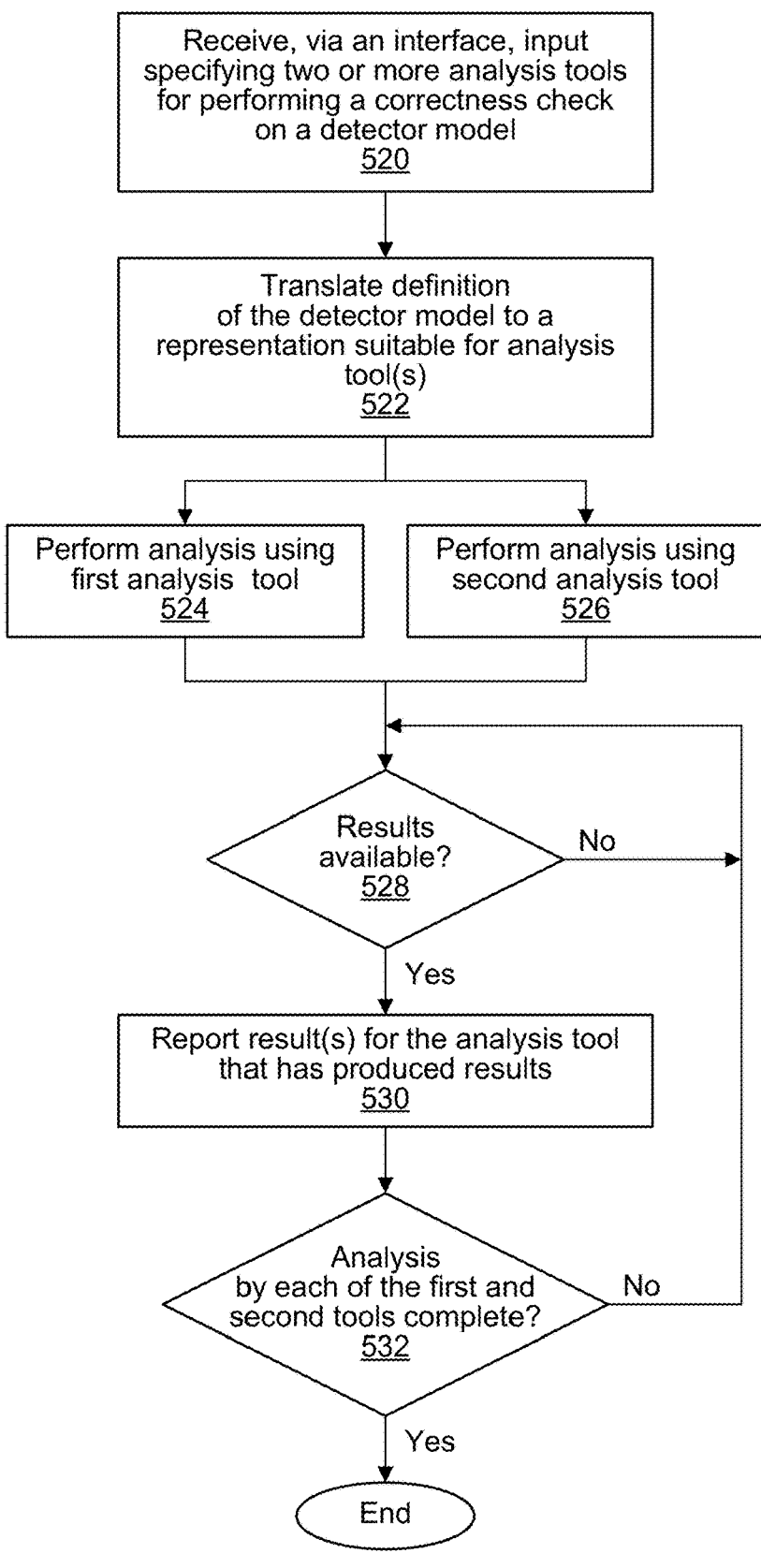
FIG. 5B illustrates a flowchart for IoT event detector correctness verifications, according to some embodiments.
Figure 6:
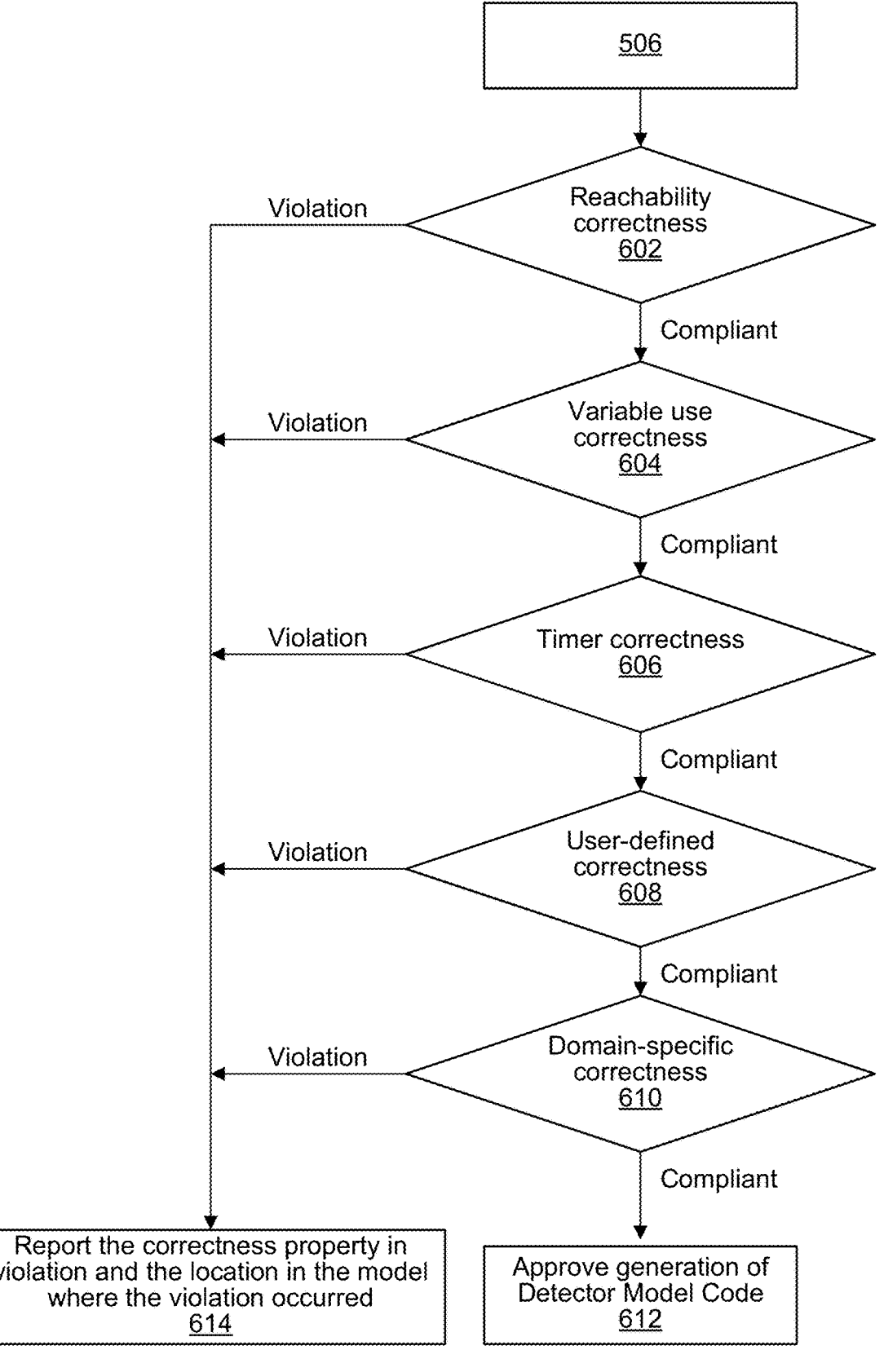
FIG. 6 illustrates a flowchart for IoT event detector correctness verifications, according to some embodiments.

Event detector data model correctness checker 114 is illustrated with model analyzers 308A-N which may function to analyze the detector models for correctness (e.g., as illustrated in FIGS. 5A, 5B, and 6). Event detector data model correctness checker 114 is illustrated with model correctness report generator 310 which may function to generate and sent a report, based on the results of the correctness check. In some embodiments, model correctness report generator 310 may determine a location, in the model definition, associated with a violation of the correctness check and indicate the location in the report.

Automated Reasoning Tools

In embodiments, the model analyzer(s) 308A-N may implement various automated reasoning tools in an unexpected manner and outside normal and intended use of the tools. For example, some automated reasoning tools reason over a representation of a program (e.g., a JAVA program or the like) used by software developers. The IoT service 110 described herein may maintain an internal representation of the detector model(s) which may also include an expression language (e.g., an expression language developed by/for the IoT Service 110 event service 112). In embodiments, there are no known automated reasoning tools that reason over this internal definition of a detector model-the existing software analysis frameworks instead reason over software-not over a model of the software.

Automated reasoning tools include software analysis frameworks particular to various languages, may be extensible, provide symbolic execution, and may combine symbolic execution with model checking. At least some of the reasoning tools used as part of the implementations described herein for various embodiments may implement bounded model checking.

It is contemplated that various techniques may be applied to evaluate the internal representation of the detector mode. For example, the IoT service may directly translate the detector model definition into a language in which the automated reasoning tool can reason over. In another example, the IoT service could translate the IoT detector model definition first into an intermediate representation (IR), and then translate the IR into the language in which the automated reasoning tool can reason over.

As described herein, in some embodiments, the technique includes compiling the internal representation of a detector model to a representation that existing automated reasoning tools can analyze. For example, the IoT service 110 my compile the detector model definition to another representation like Java and reason about the detector model over that representation. In another example, the IoT service 110 may reason about detector models in the internal representation.

In embodiments, an instance of a model analyzer, such as model analyzer 308A may function as a particular type of analysis tool different from model analyzer 308B. A model analyzers 308A-N may include a combination of analysis tools, in some embodiments.

FIG. 4 illustrates a detector model definition that includes state diagram for a detector model subject to IoT event detector correctness verifications, according to some embodiments. In embodiments, a definition of the model includes a definition of the system state 402 and a definition of the state machine, with transitions (and associated conditions) and actions for the model (illustrated in the right, in FIG. 4). A customer may interact with a user interface to define custom characteristics of the states, transitions and actions for a particular detector model and then request that the IoT service 110 perform a correctness check on the customized model.

In particular, on the left-hand side of FIG. 4, system state definition 402 is illustrated with various state variables A-N, timers A-N and transitions that have been customized for a particular detector model. In the illustration, inputs (e.g., IoT related data from IoT devices) and actions can cause changes to variables, actions may cause timers to be set, and transitions cause changes to the current model state, in the illustrated embodiment.

On the right-hand side of FIG. 4 is a state diagram for the model definition that illustrates relationships between the various states, transitions and actions defined by detector model definition 402. States A, B, C, D and E are illustrated (e.g., state A may be a "normal" state, state B may be an "off-line" state, state C may be a "testing" state, etc.) with transitions T(C) between the various states. Transitions are associated with conditions, such as but not limited to input Value<0, counterValue>10, and heartBeatValue>0, etc. for example.

States in the illustrated detector model have corresponding lifecycle events (e.g., onEnter, onInput, onExit) with transitions and actions defined within each lifecycle event. Transitions may only change the current state of the detector whereas actions can change variables and timers, in embodiments. Non-exhaustive examples of actions include increment counter, send a message, set timer, etc.

In the illustrated example, Transition$_2$ (condition$_2$) (e.g., if an input data value is greater than 212 degrees Fahrenheit) leads out of state A into state B, which is illustrated with an OnEnter action i. (e.g., send a message) and T$_9$(C$_9$) leads out of state A to state C with an OnEnter action ii. (e.g., increment a count value). State C is illustrated with on OnInput action (e.g., increment a variable to the input value) that is triggered by T$_7$C$_7$ (e.g., receive an input>5). Other states, transitions, and actions are illustrated as non-exhaustive examples.

In the illustrated embodiments, conditions may be expressed in terms of the current state, variables and timers. A trigger (e.g., a new input has arrived, a timer expires, etc.) causes evaluation of the conditions, perhaps leading to a change of state or other action. In embodiments, expression evaluation can either be triggered by a new message being received by the detector or a timer expiration in the detector's state, as non-exhaustive examples. A trigger type represents the reason an expression is being evaluated in a detector model, in embodiments.

FIG. 5A illustrates a flowchart for IoT event detector correctness verifications, according to some embodiments. The functionality illustrated in FIG. 5A may be performed by one or more components of an event service (e.g., 112) in embodiments. An IoT data event detector model is determined. In the illustrated example, the service may receive input specifying a state-machine based IoT data event detector model that specifies one or more actions (block 502) and an IoT data event detector model may be generated (e.g., compiled or otherwise), based on the input (block 504). For example, the state-machine based IoT data event detector model may be input via an interface (e.g., a GUI, programmatically, etc.). Alternatively, the service may obtain a user-provided IoT data event detector model (block 505) in embodiments. For example, a user may specify a location of an existing detector model.

In either case, input specifying a correctness check for the detector model is received (block 506). For example, FIG. 7 (described below) illustrates a user interface of event model builder 118 with a user interface element "Run Analysis" that when selected causes a correctness check to be performed on the detector model illustrated in the user interface window. In some embodiments, performance of the correctness check (block 508) may include applying one or more types of analysis tools to the detection model. For a detector model the is found compliant (block 508, compliant)

approval of the detector model is reported (e.g., by Model correctness report generator 310). For a non-compliant model, the correctness property for which the detector model was found non-compliant is reported, along with the location in the model where the violation occurred (block 512).

In some embodiments, a process similar to that illustrated in FIG. 5A may be performed across a combination of detector models, in series or in parallel, in various embodiments. A process similar to that illustrated in FIG. 5A (e.g., applying one or more types of analysis tools) may be performed across a combination of detector models, in series or in parallel, in various embodiments FIG. 5B illustrates a flowchart for IoT event detector correctness verifications, according to some embodiments. In the illustrated embodiment, input specifying two or more analysis tools for performing a correctness check on a detector model is received (block 520). For example, a user interface may provide interface elements for selection from among a group of available (e.g., default, domain-specific, or otherwise) analysis tools. In some embodiments, a single one of the analysis tools may be selected.

In the illustrated embodiment, a definition of the detector model is translated (e.g., compiled) into a representation suitable for the selected analysis tool(s) (block 522). For instance, some systems may generate a detector model using a proprietary internal representation of the model definition that some analysis tools cannot reason over. Some embodiments provide for translating that internal proprietary definition into another representation (e.g., JAVA or similar) with which an analysis tool is compatible. In some embodiments, block 522 may be skipped.

Blocks 524 and 526 illustrate parallel analysis of the detector model. Analysis using the first analysis tool is performed (block 524) and the analysis at least partially overlaps in time with analysis using the second analysis tool (block 526) in embodiments. If more than two analysis tools were selected in block 520, the additional analysis tools may be run in parallel as well. It is contemplated that some systems may perform the two or more separate analysis in series, in embodiments.

Blocks 528-532, together, illustrate that the system may function to provide results from one analysis, while other analysis continues. For example, if the first analysis tool (e.g., a bounded tool) completes first, those results may be reported even while the second analysis continues. If no results are available (block 528, no), the process may wait until results are available from one of the analysis tools (block 528, yes) and report results for the analysis tool that has produced the results (block 530). If other analysis tools have not completed (block 532, no) the system way return to block 528, waiting for those results. Once all of the analysis tools have completed analysis and provided results (block 532, yes) the process may end, in the illustrated embodiment.

FIG. 6 illustrates a flowchart for IoT event detector correctness verifications, according to some embodiments. In the illustration, blocks 602-608 expand upon the feature illustrated in block 508 in FIG. 5A. In response to receiving a request to perform a correctness check (block 506) the event detector data model correctness checker 114 may perform various correctness checks (e.g., via one or more analysis tools). A non-exhaustive list of correctness checks are illustrated and some correctness checks may have one or more sub-checks, in embodiments. In the illustrated example, a reachability correctness check is performed (block 602). For example, the event detector data model correctness checker 114 (e.g., an analysis tool, in embodiments) may reason over a representation of a detector model definition to determine whether all variables, states and/or actions are reachable. For a detector model definition found compliant with the reachability correctness property (block 602, compliant) process moves onto the next correctness check-variable use correctness (block 604). For example, a variable use correctness check may check that all of the variables in the detector model are set before they are used.

For a detector model definition found compliant with the variable use correctness check (block 604, compliant) the process may move onto the next correctness check-timer correctness. Various different types of timer correctness checks (e.g., timer-based correctness properties indicating correct timer usage) are contemplated, without limitation. For example, an input-timer correctness check may check that the detector model does not send input to itself due to a time expiration. A timer-set correctness check may check that all timers are set before being reset or cleared. For a detector model definition found compliant with the one or more timer correctness checks (block 606, compliant) the technique may move onto a user-defined correctness check (block 608) and/or a domain-specific correctness check (block 610). For example, FIG. 3 illustrates a correctness property interface 306 that may function to receive customized correctness checks from a test engineer (e.g., via an interface) and FIG. 7 illustrates an interface element "new property" that when selected, may initiate receipt of the customized correctness check. Once defined, the customized correctness check may become part of the correctness checks, as illustrated in FIG. 6.

If found compliant, the generation of the detector model code for execution may be approved (block 610). If any of the correctness checks are found to be violated, the correctness check properties found to be violated are reported, along with identification of the location in the detector model where the violation occurred (block 614) in the illustrated embodiment.

In embodiments, the various correctness properties (e.g., blocks 602-608) selected for a particular correctness check analysis may be a group of correctness properties particularly selected (e.g., by a test engineer via an interface, or based on results of analysis by an analytics service 117) for a particular domain (e.g., domain-specific correctness check properties) and may intentionally exclude correctness check properties that are not particularly-suited for that domain.

FIG. 7 illustrates a user interface for a system that implements IoT event detector correctness verifications, according to some embodiments. An interface for event model builder 113 is illustrated where clients build (or upload existing) detector models. In the top half of the illustration is a detector model with start, "Normal" and Off-line" states as well as transitions between the normal and off-line states.

Along the top of the illustration are selectable interface elements for creating a "New Property" (selection of this interface element causes the interface to prompt for, and receive specification of a new, custom correctness property (which corresponds with correctness property interface 306, in embodiments). Also illustrated are "Run Analysis" and "Publish" interface elements for selecting corresponding functionality. For instance, selection of the "Run Analysis" interface element may cause the event detector data model correctness checker 114 to perform a correctness check on the model, in accordance with the techniques described herein (e.g., in accordance with the techniques illustrated in FIGS. 5A, 5B and 6).

The bottom half of FIG. 7 illustrates results of the analysis as a report. For example, the text illustrates that the analysis resulted in discovery of a violation of correctness (e.g., the "off-line" state is unreachable) and an arrow in the interface points to a location in the program definition representation, the location associated with the violation. Additionally, the "Off-line" state of the state diagram for the detector model is bolded, further indication a location within the model of the violation. An interface that points out the location of violations may help to more quickly direct a test engineer to an area of the detector model that is causing the violation so that it can be corrected more quickly, in embodiments.

Figure 8:
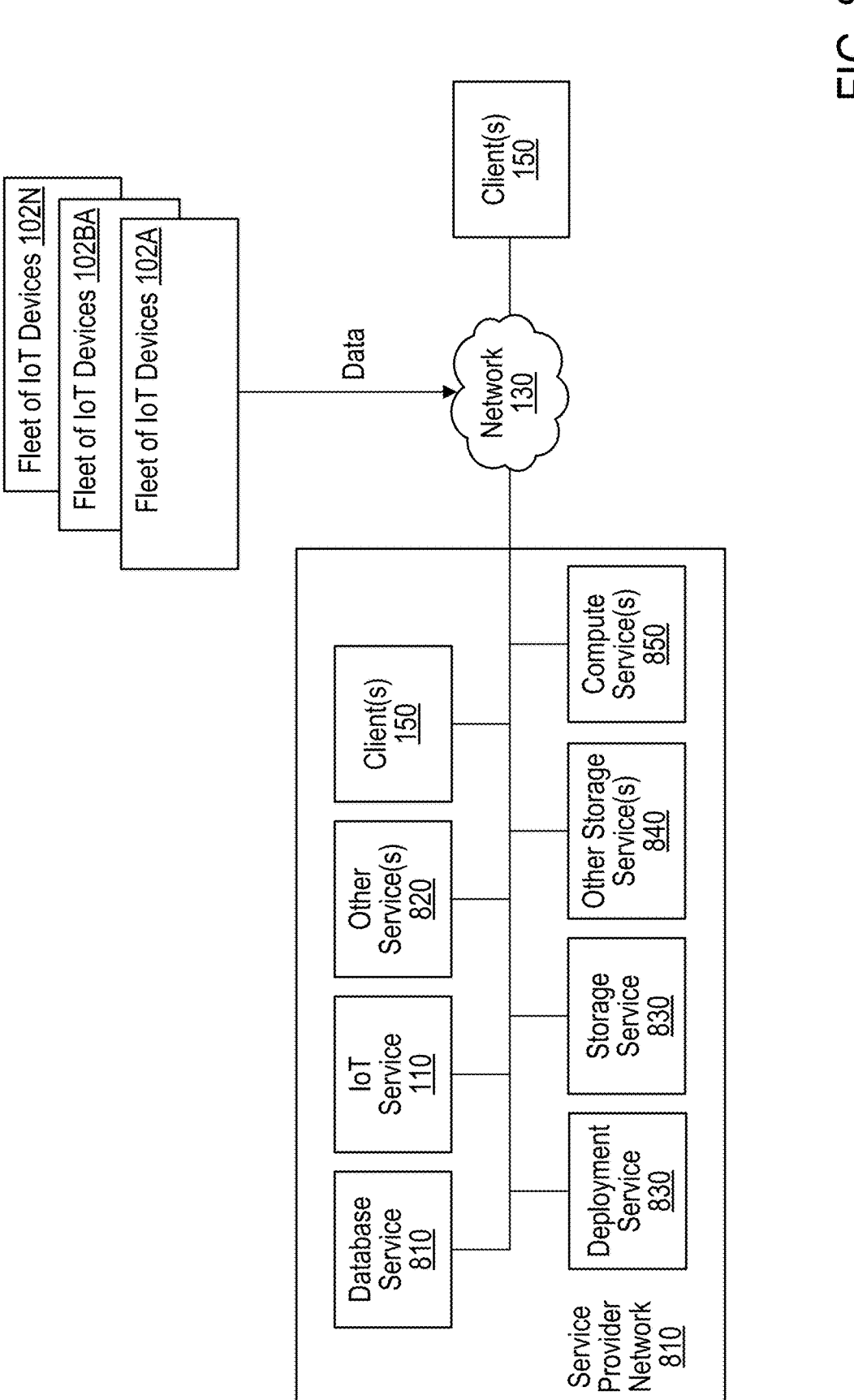
FIG. 8 illustrates a service provider network with various services that implement one or more portions of IoT event detector correctness verifications, according to embodiments.

FIG. 8 illustrates a service provider network 810 that implements IoT event detector correctness verification as a service, according to embodiments. Depicted is a IoT service 110 similar to that illustrated in FIG. 1, that may perform some of the steps illustrated in at least FIGS. 5A, 5B and 6. In FIG. 8, fleets of IoT devices are communicatively coupled to service provider network 810 via network 130 and send data to service provider network 810 that processes the data.

The IoT service 110 is illustrated as part of service provider network 810 that includes, deployment service 830, database service 810, storage service 830, compute service 850, clients 150 as well as other storage services 840 and other services 820. In at least the illustrated embodiment, the service provider network 810 is communicatively coupled to a client network of clients 150 via network 130. Service provider network 810 may provide one or more services to a plurality of distinct customers, each distinct customer comprising a distinct customer network. One or more of the components in FIG. 8 may be implemented by one or more of the computing nodes 900 illustrated in FIG. 9, in embodiments.

Example Computer System

Figure 9:
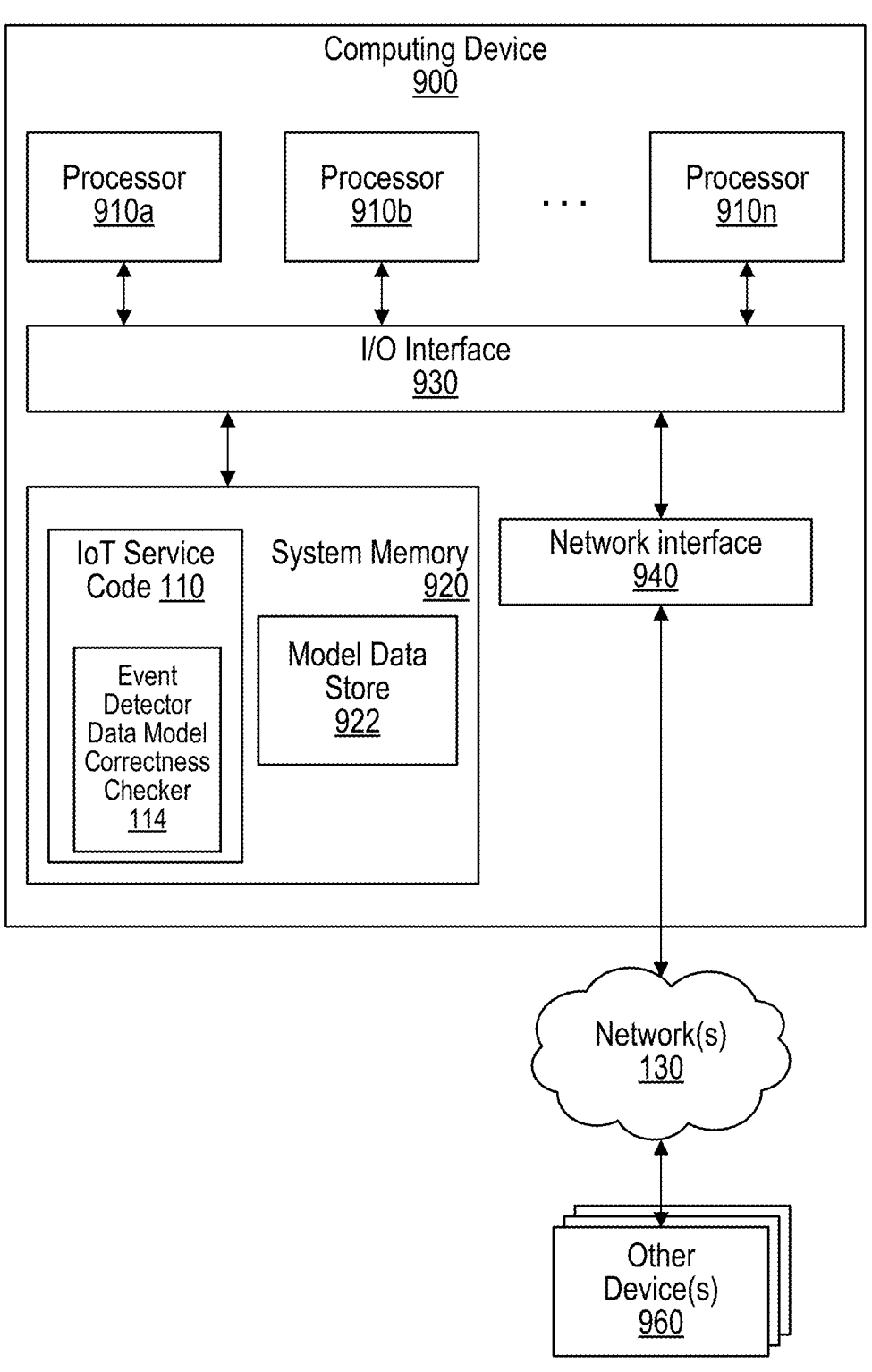
FIG. 9 illustrates an example of a computer system, one or more of which may implement various components described and illustrated throughout the disclosure, including IoT event detector correctness verifications, according to embodiments.

FIG. 9 illustrates an example of a computer system, one or more of which may implement various components described and illustrated throughout the disclosure, including IoT event detector correctness verification, according to embodiments.

Various portions of systems in FIGS. 1-3, 8 and 9 and/or methods presented in FIGS. 5A, 5B, and 6 described herein, may be executed on one or more computer systems similar to that described herein, which may interact with various other devices of the system.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 960, such as cursor control device, keyboard, audio device, and display(s). In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for IoT event detector correctness verification may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 920 may be configured to store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for an IoT event detector correctness verification system and method, are shown stored within system memory 920 as IoT service code 110 and model data store data 922, respectively. In other embodiments, program instructions and/or data may be received, sent, or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940. Program instructions may include instructions for implementing the techniques described with respect to any of the FIGs.

In some embodiments, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 900 may include input/output devices that may, in some embodiments, include one or more display terminals, keyboards, keypads, touchpads, scanning devices, voice or optical recognition devices, accelerometers, multitouch screens, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions (e.g., such as IoT service code 110, event detector data model correctness checker 114), configured to implement embodiments of IoT event detector correctness verification as described herein, and data storage 922, comprising various data accessible by the program instructions 110. In one embodiment, program instructions 110 may include software elements of a method illustrated in the above figures. Data storage 922 may include data that may be used in embodiments described herein. In other embodiments, other or different software elements and/or data may be included.

Those skilled in the art will appreciate that computer system 900 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., certificate signing request management) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors and corresponding memory configured to implement a correctness checker configured to:
receive a request to check correctness of a deployable event detector model configured to:
detect, based on input data from one or more data-producing devices, one or more events; or
to trigger, based on the one or more detected events, one or more actions;
obtain a definition of the event detector model, wherein the definition comprises statements defining one or more variables, one or more timers, a plurality of states, transitions between the states, or one or more actions;
verify, based on an analysis of the definition of the event detector model, whether the event detector model complies with one or more correctness properties, comprising:
a set of default correctness properties used by default as part of said verify,
one or more domain-specific correctness properties tailored for correctness checks of detector models of a specific domain, one or more reachability correctness properties indicating that respective states or actions are reachable according to the definition of the event detector model, or
one or more timer-based correctness properties indicating correct usage of the one or more timers; and
generate a report indicating compliance of the event detector model with the one or more correctness properties.

2. The system of claim 1, wherein said verify whether the event detector model complies with one or more correctness properties comprises analyze, without executing the event detector model, the definition of the event detector model to verify whether the event detector model violates the one or more correctness properties.

3. The system of claim 1, wherein the correctness checker comprises one or more interface elements configured to receive specification of one or more pre-defined analysis tools for performing said verify whether the event detector model complies with the one or more correctness properties.

4. The system of claim 1, wherein the correctness checker comprises a report generator configured to, for an event detector model that does not comply with the one or more correctness properties, generate a report indicating one or more locations in the event detector model associated with the non-compliance.

5. The system of claim 1, wherein the one or more processors and corresponding memory implement:
an event model builder configured to receive input defining an event detector model, wherein the input specifies:
one or more variables to be set based at least in part on input data generated by one or more devices,
a plurality of states,
one or more timers,
transitions between the states, wherein at least some of the transitions are based on at least one of the one or more variables, and
one or more actions to be taken responsive to one or more events detected based at least on the states or transitions.

6. The system of claim 5, wherein the event model builder is configured to:
generate the event detector model based on the received input such that the event detector model is deployable to:
receive the IoT input data,
detect the one or more events, and
trigger, based on the one or more detected events, respective ones of the one or more actions.

7. The system of claim 1, wherein the one or more correctness properties applied during said verify comprise:
an infinite read timer correctness property that checks that a detector model cannot infinitely send inputs to itself due to a time expiration,
a timer-set correctness property that checks that each of the one or more timers in the detector model must be set before being reset or cleared,
an input-read timer correctness property that checks that it is not possible to read from an input upon a timer expiration, or
a variable use correctness property that checks that all variables are set before being used.

8. A method, comprising:
performing, by one or more computing devices:
receiving a request to check correctness of a deployable event detector model, the deployable event detector model to perform:

detecting, based on input data from one or more of data-producing devices, one or more events, or triggering, based on the one or more detected events, one or more actions;

obtaining a definition of the event detector model, wherein the definition comprises statements defining one or more variables, one or more timers, a plurality of states, transitions between the states, or one or more actions;

verifying, based on analyzing the definition of the event detector model, whether the event detector model complies with one or more correctness properties, the correctness properties comprising:

a set of default correctness properties used by default as part of said verifying, one or more domain-specific correctness properties tailored for correctness checks of detector models of a specific domain, one or more reachability correctness properties that check that respective states or actions are reachable according to the definition of the event detector model, or one or more timer-based correctness properties that check correct usage of the one or more timers; and generating a report that indicates compliance of the event detector model with the one or more correctness properties.

9. The method of claim 8, wherein:

the correctness properties comprise a set of default correctness properties used by default as part of said verifying; and the method further comprises:

providing an interface, comprising one or more interface elements, for receiving specification of a custom correctness property; and receiving, via the interface, specification of a custom correctness property; and said verifying comprises verifying whether the event detector model complies with the custom correctness property.

10. The method of claim 8, further comprising:

responsive to receipt of another request to check correctness of another event detector model:

obtaining a definition of the other event detector model;

verifying, based on analyzing a definition of the other event detector model, whether the other event detector model complies with one or more correctness properties;

determining non-compliance of the other event detector model;

identifying a location of the non-compliant feature of the other event detector model; and generating a report that indicates the non-compliance of the event detector model and that indicates the location of the non-compliant feature in the other detector model definition.

11. The method of claim 8, wherein said analyzing the definition of the event detector model comprises translating the event detector model definition into a representation compliant with said analyzing.

12. The method of claim 8, wherein said analyzing the definition of the event detector model comprises:

analyzing the definition of the event detector in parallel by first and second analysis tools; and reporting results of the first analysis tool while the second analysis tool continues to analyze the definition.

13. The method of claim 8, wherein:

the definition of the event detector model comprises one or more timers; and one or more transitions between the states of the obtained definition of the detector model comprise a transition based on one of the timers.

14. The method of claim 8, wherein the one or more correctness properties applied during the verifying comprises:

an infinite read timer correctness property that checks that a detector model cannot infinitely send inputs to itself due to a time expiration, a timer-set correctness property that checks that each of the one or more timers in the detector model must be set before being reset or cleared, an input-read timer correctness property that checks that it is not possible to read from an input upon a timer expiration, or a variable use correctness property that checks that all variables are set before being used.

15. One or more non-transitory computer-readable media storing program instructions executable on or across one or more processors to perform:

responsive to receipt of a request to check correctness of a deployable event detector model configured to detect, based on input data from one or more data-producing devices, one or more events, or configured to trigger, based on the one or more detected events, one or more actions:

obtaining a definition of the event detector model, wherein the definition comprises statements defining one or more variables, one or more timers, a plurality of states, transitions between the states, or one or more actions;

verifying, based on analyzing the definition of the event detector model, whether the event detector model complies with one or more correctness properties, the correctness properties comprising:

a set of default correctness properties used by default as part of said verifying, one or more domain-specific correctness properties tailored for correctness checks of detector models of a specific domain, one or more reachability correctness properties that check that respective states or actions are reachable according to the definition of the event detector model, or one or more timer-based correctness properties that check correct usage of the one or more timers; and generating a report that indicates compliance of the event detector model with the one or more correctness properties.

16. The one or more non-transitory computer-readable media of claim 15, wherein to perform said verifying whether the event detector model complies with one or more correctness properties, the program instructions cause the one or more processors to perform analyzing, without executing the event detector model, the definition of the event detector model to verify whether the event detector model violates the one or more correctness properties.

17. The one or more non-transitory computer-readable media of claim 15, wherein the program instructions perform:

receiving, via one or more interface elements, specification of one or more pre-defined analysis tools for performing said verifying whether the event detector model complies with the one or more correctness properties.

18. The one or more non-transitory computer-readable media of claim 15, wherein the program instructions implement an event model builder configured to perform:

receiving input defining an event detector model, wherein the input specifies:

one or more variables to be set based at least in part on input data generated by one or more devices, a plurality of states, one or more timers, transitions between the states, wherein at least some of the transitions are based on at least one of the one or more variables, and one or more actions to be taken responsive to one or more events detected based at least on the states or transitions.

19. The one or more non-transitory computer-readable media of claim 15, wherein to perform said analyzing the definition of the event detector model the program instructions cause the one or more processors to perform:

analyzing the definition of the event detector in parallel by first and second analysis tools; and reporting results of the first analysis tool while the second analysis tool continues to analyze the definition.

20. The one or more non-transitory computer-readable media of claim 15, wherein the one or more correctness properties applied during the verifying comprises:

an infinite read timer correctness property that checks that a detector model cannot infinitely send inputs to itself due to a time expiration, a timer-set correctness property that checks that each of the one or more timers in the detector model must be set before being reset or cleared, an input-read timer correctness property that checks that it is not possible to read from an input upon a timer expiration, or a variable use correctness property that checks that all variables are set before being used.

* * * * *